US005124721A

United States Patent [19]

Sato

[11] Patent Number: 5,124,721

[45] Date of Patent: Jun. 23, 1992

[54] RECORDING SHEET AND INK JET RECORDING METHOD USING THE SAME

[75] Inventor: Hiroyuki Sato, Morioka, Japan

[73] Assignee: Alps Electric Co., Ltd., Tokyo, Japan

[21] Appl. No.: 650,844

[22] Filed: Feb. 4, 1991

[30] Foreign Application Priority Data

Mar. 31, 1990 [JP] Japan .................................... 2-86727

[51] Int. Cl.[5] ......................... G01D 15/16; B41M 3/12

[52] U.S. Cl. ....................................... 346/1.1; 346/75; 346/140 R; 346/135.1; 428/913; 428/914

[58] Field of Search ....................... 346/1.1, 75, 140 R, 346/135.1; 428/913, 914

[56] References Cited

U.S. PATENT DOCUMENTS 4,642,654 2/1987 Toganoh et al. .................... 346/1.1

4,943,555 7/1990 Nakamoto et al. ................ 428/913

*Primary Examiner*—Benjamin R. Fuller

*Assistant Examiner*—Gerald E. Preston

*Attorney, Agent, or Firm*—Guy W. Shoup; B. Noël Kivlin

[57] ABSTRACT

This invention relates to a recording sheet comprising a laminate layer made of a material that can be hardly swollen by ink on the side opposite to its ink receiving surface and to an ink jet recording method using the same. Since a recording sheet according to the invention comprises a laminate layer made of a material that can be hardly swollen by ink on the side opposite to its ink receiving surface, it is free from wrinkles even when a relatively large amount of ink is adhered to its surface and permeates into its fibrous paper substrate as the laminate layer and the recording sheet as a whole do not swell to consequently generate wrinkles.

5 Claims, 1 Drawing Sheet

RECORDING SHEET AND INK JET RECORDING METHOD USING THE SAME

BACKGROUND OF THE INVENTION

1. Field of the Invention

This invention relates to a recording sheet to be used for ink jet recording and a method of ink jet recording using the same.

2. Related Art

Ink jet recording is a recording method with which the ink contained in an ink chamber is subjected to fluctuations of pressure through mechanical vibration or displacement of the ink chamber by means of a piezoelectric device to produce ink droplets, which are ejected from nozzles toward a recording sheet that receives them for printing. The technique has been attracting public attention because it enables printing to be affected at low noise level and high speed even in color.

A recording sheet to be used for ink jet recording has to meet, among others, the following requirements.

(1) It should accurately produce an intended ink density once ink droplets are deposited on its surface.

(2) It should absorb ink at an elevated rate.

Since ink droplets reaches its surface at an elevated rate, it has to be capable of temporarily and rapidly absorbing ink in its paper layer. The higher the rate of absorption, the greater can be the printing speed. Thus, a recording sheet normally contains or is coated with an appropriate mixture of highly absorbent filler materials (additives) and hydrophilic resins.

(3) It should have high image resolving power.

The size of an dot formed by ink droplets on the surface of a recording sheet will be twice or three times as large as the diameter of an ink droplet. The image resolving power of a recording sheet is a function of the shape (roundness) and the size of the dot formed by ink droplets on its surface and the shape of the dot is closer to a circle on a coated recording sheet than on a non-coated recording sheet.

(4) Other requirements that have to be met include glossiness, clear hues, no stains due to splashed ink nor blots due to uneven dots, no shrinkage of paper at or around printed areas and water/light resistive recorded images.

While there exist no recording sheets that satisfy all the above listed conditions, coated recording sheets provided with a particular coating layer formed by combining fine silica particles and a water soluble binder agent normally show an excellent ink absorbing capability, a remarkable ink color reproducibility and an ability to produce even and circular dots. Fine silica particles can adsorb and hold pigments contained in ink and therefore impart sharpness and clearness to printed color images. Coated recording sheet provided with a coating layer comprising clay or calcium carbonate are also popular although they may be less ink absorbent, less remarkable for ink color reproduction and less capable of producing sharp and clear images. Any of these recording sheets show a cross section as illustrated in FIG. 2, where a fibrous paper substrate 1 carries a coating layer 2.

However, known recording sheets as described above are accompanied by a number of problems as listed below which are particularly significant when they are employed for color printing using more than one primary color inks.

In a multi-color ink jet recording apparatus using recording sheets, the number of different color inks stored in the system is limited (to, for instance, four or yellow, magenta, cyan and black) and a desired color other than these (e.g., red, blue, green) is produced by appropriately combining any of the inks and applying them sequentially to a particular area of a recording sheet. Consequently, such an area eventually can carry a disproportionally large amount of inks, which can permeate into the paper substrate 1 through the coating layer 2 to swell the former, entailing the problem of shrinkage. When the paper substrate shrinks to produce wrinkles, the surface of the recording sheet is corrugated and the ridges of the corrugation can eventually touch any of the jet nozzles of the print head for ejecting ink of the ink jet recording apparatus arranged very close to the surface of the recording sheet to stain the recording sheet and destruct the nozzles of the print head. Even if only an ink is used for printing, wrinkles can appear on the recording sheet when ink is densely or daubingly applied to its surface.

SUMMARY OF THE INVENTION

In view of the above listed problems and other problems, it is therefore an object of the present invention to provide a recording sheet to be used for ink jet recording which is free from wrinkles even if different color printing inks are used or if it is daubingly covered with printing ink and an ink jet recording method using the same.

Another object of the present invention is to provide an ink jet recording method to be conducted by adhering ink on the surface of a recording sheet, wherein said recording sheet is laminated with a material that can be hardly swollen by ink on the side opposite to its ink receiving surface, said material that can be hardly swollen by ink being a plastic film or a metal foil.

With a recording sheet and an ink jet recording method according to the invention, since the recording sheet is laminated with a plastic film or a metal foil on the side opposite to its ink receiving surface, it is free from wrinkles even when a relatively large amount of ink is adhered t its surface and permeates into its fibrous paper substrate, because the laminate layer does not swell and firmly holds the paper substrate against swelling.

Now, the present invention will be described by referring to the accompanying drawings that illustrate a preferred embodiment of the invention.

DETAILED DESCRIPTION OF THE INVENTION

Figure 1:
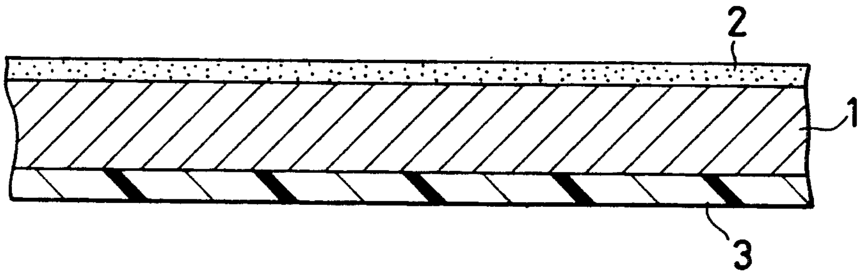
FIG. 1 is a schematic sectional view of a preferred embodiment the recording sheet of the invention.
Figure 2:
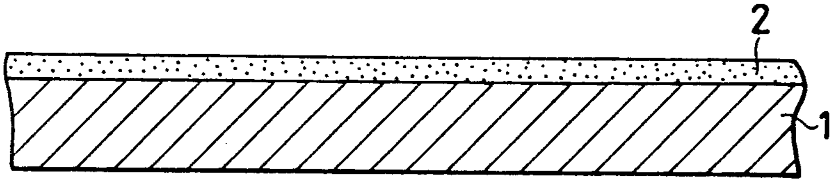
FIG. 2 PRIOR ART
FIG. 2 is a schematic sectional view of a conventional recording sheet.

Referring to FIG. 1 that illustrates a preferred embodiment of the recording sheet of the invention, reference numeral denotes a paper substrate made of fibrous paper and 2 denotes a coating layer disposed on a surface of the paper substrate 1. A laminate layer 3 is disposed on the side opposite to the surface that carries the coating layer 2. Said laminate layer 3 is either a plastic film or a metal foil that can be hardly swollen by ink.

Said laminate layer 3 is realized by applying adhesive to a side of the plastic film or metal foil and heating and pressing the side that carries the adhesive against a surface of the paper substrate 1. It should be noted that the coating layer 2 may not necessarily be needed to provide a recording sheet according to the invention.

Table 1 below shows the result of an experiment conducted by using a number of sample recording sheets having a configuration as described above by referring to a preferred embodiment of the invention but carrying different laminate layers and those selected from known recording sheets for comparison. In the experiment, ink was daubingly applied to each of the samples by ejecting ink droplets from nozzles at a rate of 160DPI (dots per inch)×160DPI on an area of 200 mm×200 mm sequentially for three colors of yellow, cyan and magenta and each of the samples was observed for generated wrinkles for evaluation. Of the two samples selected from known recording sheets for comparison, IJ MAT COAT MN is a sheet carrying a coating layer 2 whereas IJ SHEET M is an ordinary ink jet recording sheet comprising only a fibrous paper substrate 1 and carrying no coating layer. (Both of them are trade names of Mitsubishi Paper Mills, Ltd.) The inks used are those ordinarily used for ink jet recording.

TABLE 1

| | Substrate | Laminate Layer Material/Thickness | Wrinkles Observed |
|---|---|---|---|
| Sample 1 | IJ MAT COAT MN | Polypropylene 15 μm | None |
| Sample 2 | IJ MAT COAT MN | Polyester 30 μm | None |
| Sample 3 | IJ SHEET M | Polyethylene 30 μm | None |
| Sample 4 | IJ SHEET M | Polypropylene 15 μm | None |
| Sample 5 | IJ MAT COAT MN | Aluminum Foil 25 μm | None |
| Sample 6 | IJ SHEET M | Aluminum Foil 25 μm | None |
| Sample 1 for Comparison | IJ MAT COAT MN | None | Yes |
| Sample 2 for Comparison | IJ SHEET M | None | Yes |

As indicated by Table 1, generation of wrinkles is far less conspicuous with the sample recording sheets according to the invention than with the samples selected from known recording sheets.

As is apparent from the above description, as a recording sheet laminated with a plastic film or a metal foil on the side opposite to its ink receiving surface is used for jet ink recording, it is free from wrinkles even when a relatively large amount of ink is adhered to its surface and permeates into its fibrous paper substrate, because the laminate layer does not swell and firmly holds the paper substrate against swelling. Consequently, it is free from any trouble where the surface of the recording sheet is corrugated and the ridges of the corrugation eventually touch any of the jet nozzles of the print head for ejecting ink of the ink jet recording apparatus to stain the recording sheet and destruct the nozzles of the print head. Besides, since any potential wrinkles in the paper substrate is suppressed by the laminate layer, neither the paper substrate nor the coating layer requires consideration for any particular antiwrinkle measures and therefore favorable candidates for the paper substrate and the coating layer can cover a wide variety of materials.

What is claimed is:

1. An ink jet recording sheet comprising:

a paper substrate layer made of a fibrous material;

a coat layer provided on a first surface of said paper substrate layer for deposition of an ink thereon; and a laminate layer disposed on a second surface of said paper substrate layer that is opposite to said coat layer.

2. An ink jet recording sheet according to claim 1, wherein said laminate layer includes a plastic film.

3. An ink jet recording sheet according to claim 1, wherein said laminate layer includes a metal foil.

4. An ink jet recording method comprising the step in which recording is conducted by causing ink to deposit on a recording sheet, wherein the improvement comprises that said recording sheet includes:

a paper substrate layer made of a fibrous material;

a coat layer provided on a first surface of said paper substrate layer for deposition of ink thereon; and a laminate layer disposed on a second surface of said paper substrate layer that is opposite to said coat layer.

5. An ink jet recording sheet comprising:

a paper substrate layer made of a fibrous material;

a coat layer provided on a first surface of said paper substrate layer for deposition of an ink thereon; and a laminate layer heat-bonded to a second surface of said paper substrate layer that is opposite to said coat layer, said laminate layer including a plastic film or a metal foil.

* * * * *